US009105973B2

(12) United States Patent
Anagnostou et al.

(10) Patent No.: US 9,105,973 B2
(45) Date of Patent: Aug. 11, 2015

(54) OPTICALLY SCANNABLE CODE ANTENNA

(71) Applicants: Dimitrios Anagnostou, Rapid City, SD (US); William Cross, Rapid City, SD (US); Jeevan Meruga, Rapid City, SD (US); Jon Kellar, Rapid City, SD (US)

(72) Inventors: Dimitrios Anagnostou, Rapid City, SD (US); William Cross, Rapid City, SD (US); Jeevan Meruga, Rapid City, SD (US); Jon Kellar, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 0 days.

(21) Appl. No.: 14/213,463

(22) Filed: Mar. 14, 2014

(65) Prior Publication Data

US 2014/0263662 A1 Sep. 18, 2014

Related U.S. Application Data

(60) Provisional application No. 61/784,695, filed on Mar. 14, 2013.

(51) Int. Cl.
*G06K 19/06* (2006.01)
*H01Q 1/44* (2006.01)

(52) U.S. Cl.
CPC ........................................ *H01Q 1/44* (2013.01)

(58) Field of Classification Search
CPC . B42D 15/00; G06K 19/083; G06K 7/10861; G06Q 30/02; G06Q 30/0207; G06Q 99/00; G09F 2003/0257; G09F 3/0288; G09F 3/0297; H01Q 1/44; Y10T 29/49002; Y10T 29/49826
USPC .......................................... 235/435, 494, 492
See application file for complete search history.

(56) References Cited

U.S. PATENT DOCUMENTS

| | | | | |
|---|---|---|---|---|
| 8,215,565 | B2 * | 7/2012 | Howard | 235/494 |
| 2008/0100452 | A1 * | 5/2008 | Lazo | 340/572.7 |
| 2011/0062237 | A1 * | 3/2011 | Chaves | 235/454 |
| 2013/0105587 | A1 * | 5/2013 | Simske et al. | 235/492 |
| 2013/0221108 | A1 * | 8/2013 | Cok | 235/492 |
| 2014/0167732 | A1 * | 6/2014 | Mueller et al. | 324/72 |

* cited by examiner

*Primary Examiner* — Seung Lee
(74) *Attorney, Agent, or Firm* — McKee, Voorhees & Sease, PLC

(57) ABSTRACT

An optically scannable code antenna is provided. Encoded matrix codes are printed with electrically conductive material on a substrate. An antenna pattern is generated on the substrate from the electrically conductive material. Enclosed information in the matrix code and accessible via the antenna pattern is provided. At least a portion of the antenna pattern is also a portion of the matrix code. Signals are transmitted and received from the antenna pattern made up of a portion of the matrix code formed on the substrate by electrically conductive materials. Authentication and security measures using the matrix code and signal from the antenna pattern are also provided.

25 Claims, 10 Drawing Sheets

FIG. 6

OPTICALLY SCANNABLE CODE ANTENNA

CROSS REFERENCE TO RELATED APPLICATIONS

This application claims priority under 35 U.S.C. §119 to provisional applications U.S. Ser. No. 61/784,695 filed Mar. 14, 2013, herein incorporated by reference in its entirety.

BACKGROUND OF THE INVENTION

1. Field of the Invention

The present invention relates to an optically scannable code antenna. More specifically, but not exclusively, the present invention relates to an apparatus and method for a scannable code antenna such as a quick response (QR) scannable code antenna.

2. Description of the Prior Art

Encoding information and data in an optical machine-readable representation (e.g., geometric patterns in two-dimensions) is widely used. A quick response (QR) code is one form of embedded representation of data or information captured by one or more forms of geometric representations. Some scannable codes use geometric representations in the form of rectangles, dots, hexagons, and other geometric patterns in two-dimensions (2D) to embed data or information. Linear (2D) codes include a number of matrix (2D) bar codes. For example, a data matrix code, QR code, and SPARQCode are all forms of matrix (2D) bar codes, which can be used to encode data or information. Various electronic devices including cameras, smart phone devices and other scanning devices can be used to scan and recognize the embedded data or information within the code. Presently, the geometric representations forming these types of codes are not active components of the code.

Therefore, at last one objective is to provide a scannable code, such as an optically scannable code, that uses encoded geometric representations of information associated with the code as an antenna for receiving and transmitting radio waves.

Embedded data or information is captured in one or more forms of geometric representations of information/data (e.g., matrix bar codes, including QR codes). These same forms of geometric representations of information/data can be leveraged to access and store information.

Therefore, a further objective is to provide an optically scannable code that receives and transmits radio waves in addition to encoding geometric representations of information/data. Moreover, what is needed is a scannable code that is capable of conveying data or information using the information represented by the different shapes on the code in combination with or separately from signals, codes and/or messages acquired using one or more geometric representations as an antenna operating within a specified frequency spectrum.

Another objective is to provide a scannable code that uses data or information encoded in the geometric representations of the code to corroborate, decrypt, or otherwise provide security features for data or information made available by transmission of one or more signals from the geometric representations serving as an antenna for a microchip such as a RFID chip.

One or more of these and/or other objects, features, or advantages of the present invention will become apparent from the specification claims that follow.

SUMMARY OF THE INVENTION

One embodiment provides an apparatus that includes, amongst other things, a boundaried arrangement of a plurality of modules configured to convey one or more types of information represented on a scannable code. A subset of the plurality of modules is contained within the boundaried arrangement. One or more electrically conductive pathways may be configured between the subset of the plurality of modules. In a preferred form, the subset of the plurality of modules having one or more conducting pathways is configured as an antenna element.

Another embodiment provides a quick response (QR) code antenna. The QR code antenna includes a substrate and a boundaried physical arrangement of a plurality of modules on the substrate. Information is encoded by the boundaried physical arrangement of the plurality of modules on the substrate. One or more conducting pathways are formed between at least a portion of the plurality of modules on the substrate. An antenna pattern is configured from the one or more conducting pathways between the plurality of modules. In a preferred form, the QR code antenna includes an integrated circuit connected to the antenna pattern.

Yet another embodiment provides a method for a scannable code. The method includes providing a substrate and encoding information on the substrate in a boundaried physical arrangement of a plurality of modules. A subset of the plurality of modules are configured to be conductively linked within the boundaried arrangement. One or more types of information is communicated from one or more sources that include, for example, the boundaried arrangement of the plurality of modules and the subset of the plurality of modules within the boundaried arrangement. In a preferred form, information is received and transmitted through the conductively linked subset of the plurality of modules within the boundaried physical arrangement.

Still another embodiment provides a method. The method includes encoding data within a two-dimensional bar code printed as an electrically conductive material on a substrate. An antenna pattern is also generated on the substrate using the electrically conductive material. The two-dimensional bar code and the antenna pattern are preferably integrated such that at least a portion of the antenna pattern is also a portion of the two-dimensional bar code. In one aspect, the two-dimensional bar code is a quick response (QR) code and data is read from the two-dimensional bar code. In one other step, transmitting a signal from the antenna pattern and receiving the signal is provided. One or more authenticating steps may include, at least, determining if an article associated with the two-dimensional bar code and the antenna pattern is genuine using the data from the two-dimensional tag and the signal.

BRIEF DESCRIPTION OF THE DRAWINGS

Illustrative embodiments of the present invention are described in detail below with reference to the attached drawing figures, which are incorporated by reference herein and wherein:

FIG. 6 is a pictorial representation of a QR code with an antenna pattern in accordance with an illustrative embodiment;

DETAILED DESCRIPTION OF THE PREFERRED EMBODIMENTS

It is noted that the following description is given in the context of QR codes. However, other optically scannable codes (e.g., linear (2D) barcodes) may also be configured according to the concepts described herein (e.g. bar codes and the like). Other matrix barcodes may be suitable, such as for example Data Matrix, SPARQCodes and other like codes that could be configured as an antenna.

Figure 1:
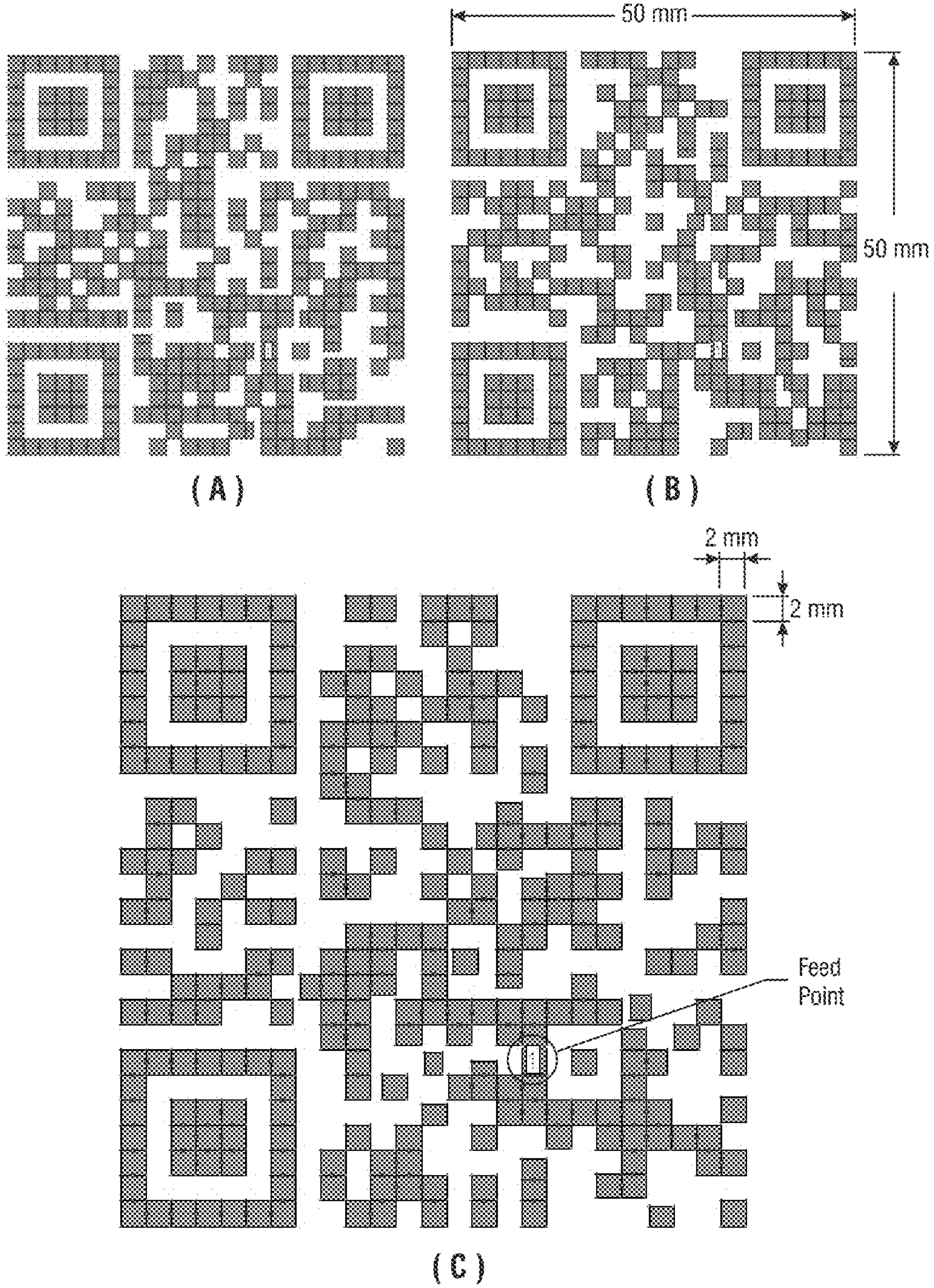
FIGS. 1A-C are pictorial representations of various QR code antenna patterns in accordance with an illustrative embodiment.

FIGS. 1A-C provide pictorial representations of a plurality of QR code antennas in accordance with embodiments of the present application. The QR codes used represent the "http://www.sdsmt.edu" website address; however the design and methodology can be applied to other QR codes as well. Here three different QR code antennas are generated using different websites based on different error correction level: Antenna 1 shows "www.sdsmt.edu" and is made with QR Code Version V02 and Code Error Correction L (~7% of the codewords can be restored); Antenna 2 shows "http://www.sdsmt.edu" and has the same Version and Error Correction; and Antenna 3 carries the same message. Each code includes one or more alignment squares (e.g., 2-3 larger squares in corners of the boundaried physical arrangement of a set of modules (i.e., small squares making up the alignment squares and geometric representations of encoded data/information boundaried by one or more of the alignment squares)). Although QR codes are pictorially represented, other codes are contemplated, including Data Matrix, SPARQCodes and other like codes having a similar boundaried or semi-boundaried physical layer of a plurality of arranged modules. Other codes, such as a 2D barcode would likely not be suitable candidate for employing one or more aspects of the present invention. Although each of the modules are represented a square geometries, other geometries are contemplated. For example, rectangles, dots, hexagons and other geometric patterns may be used to form one or more of the modules alone or together with other shape types. Each of the QR codes includes an antenna feed. The antenna feed generally includes components of the antenna which transmit or receiving radio waves for the rest of the antenna structure. The antenna feed may be configured to collect incoming radio waves, convert them to electric current and transmit them to an integrated circuit or vice-versa. Although not shown, the feed point is configured to communicate with an integrated circuit, such as a silicone microchip, RFID chip or like microchip. In the case of an RFID chip, the apparatus of the present invention may be configured to in a passive, semi-passive or active mode. Various microchips and types suitable for use with the present invention are commercially available, including RFID microchips.

The desired frequency of operation for the antennae of FIGS. 1A-C was chosen as 2.4 GHz. The number of electrically conducting modules can be adjusted up or down thereby allowing the antenna to be tunable to a desired operating frequency. The RF current path of each antenna was modified to maximize the number of interconnected QR code blocks/modules (2 mm×2 mm squares) and to represent better the QR code as an asymmetric, tilted dipole. By adjusting these blocks, the antenna can be configured to resonate at other frequencies yet convey the same QR code visible message. The simulated models of the QR code antennas are shown in FIGS. 1A-C and the boundaried arrangement is roughly 50 mm×50 mm in size. The antenna was printed on 32-mil Kapton®, but may be printed on any other suitable types of substrate material, including specific material types selected to aid in shielding, scattering and receiving properties of the antenna resulting from the installation environment. For example, a specific substrate material type may be selected to correspond with an installation environment, such as where a QR code antenna is installed on a device positioned within the installation environment.

As mentioned previously, alignment boxes may be included in the boundaried physical arrangement for a matrix code, such as a QR code. The alignment boxes, at least in one or more embodiments, may be only for alignment purposes and not intended to encode data/information and/or form a part of a plurality of modules forming an antenna. In other embodiments, the alignment boxes may form a part of the encoded data/information and the antenna. In the case where one or more alignment boxes are used for purposes other than alignment, the size of the QR code and antenna may have a reduced footprint from those shown in FIGS. 1A-C, which may allow for lower operating frequencies. In one example, leveraging the alignment boxes for use as a subset of the plurality of modules within a boundaried physical arrangement for forming one or more conducting pathways of the antenna may be accomplished, thereby resulting in a 7% or more of the existing code being used for purposes other than for alignment only. In one embodiment, the reduction may allow the footprint to be 1"×1" for an operating frequency of 2.4 GHz or 5 cm×5 cm for WiFi frequencies. The reduction in footprint may also make the antenna smaller while still being polarized.

The QR code antennas may be designed using IE3D™ and printed with an electrically conductive nanoink by a $M^3D$ direct-write system. The ink may include a 60% bulk Ag conductivity, which enables high efficiency conducting pathways to be formed between all or a subset of the plurality of modules within the QR codes boundaried physical arrangement of modules for forming the one or more antenna elements. Various other types of electrically conducting inks may be used, such as those types that are commercially available. The conductive constituent may comprise 60% or more, 50% or more or possibly even 40% or more of the bulk constituent, depending on the selected conductive constituent and ink. In the case where the alignment squares form a portion of the encoded data/information and the antenna, the conductive ink may be used to print or otherwise, through further means, apply these elements to a substrate. Other embodiments include use of covert, semi-covert, semi-visible, or visible inks forming one or more aspects of a QR code antenna. These and other aspects are further addressed below with regard to one or more security measures and aspects relating to the present invention.

Figure 2:
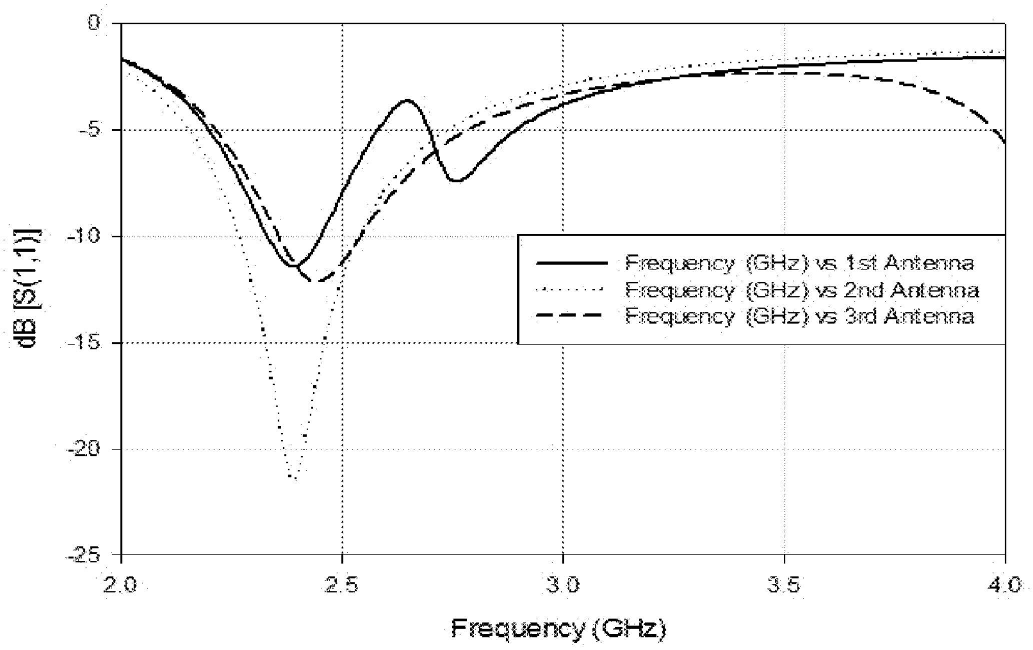
FIG. 2 is a pictorial representation of a plot for simulated return loss for the QR code antenna patterns in FIGS. 1A-C.
Figure 3:
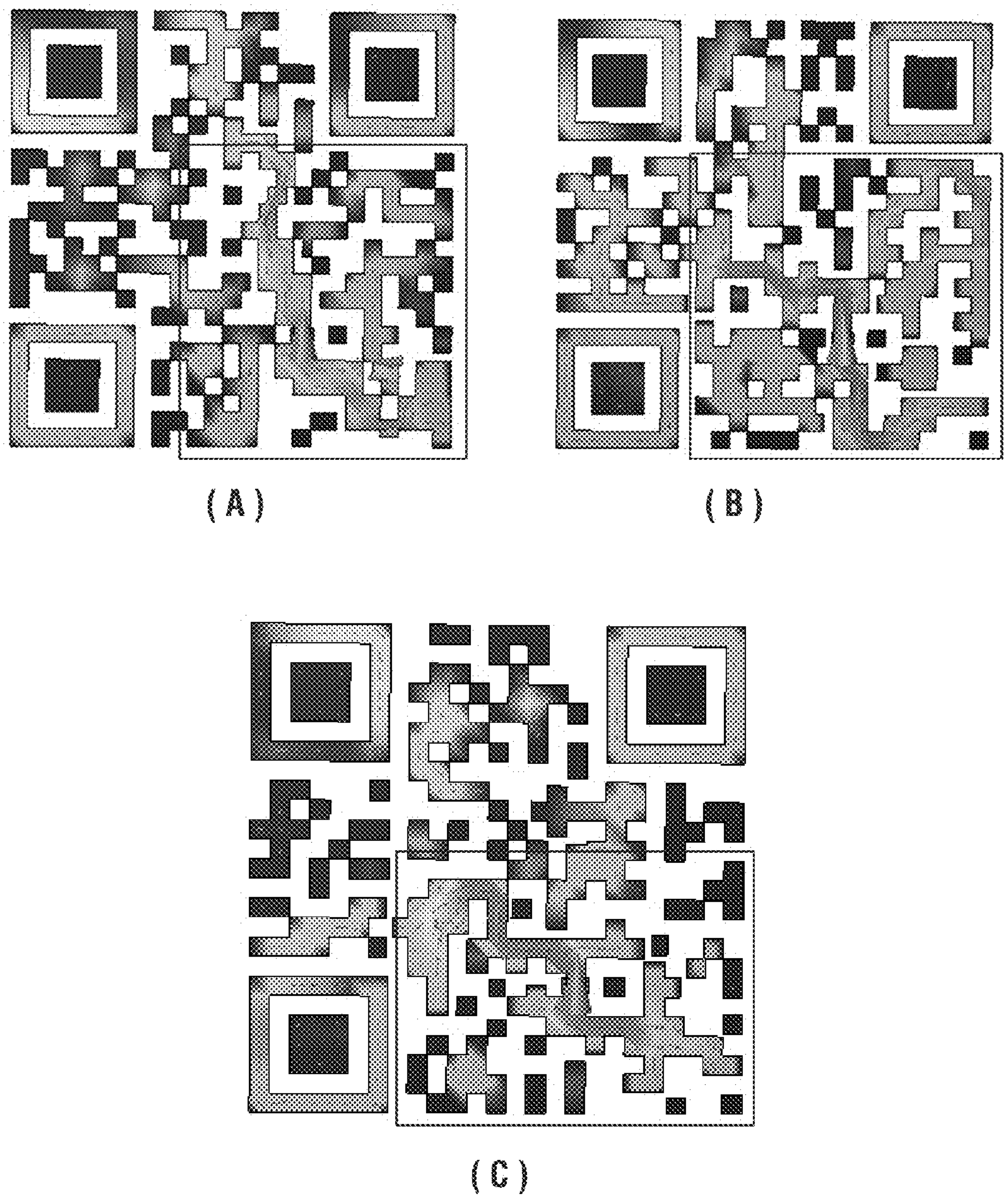
FIGS. 3A-C are pictorial representations of current density representations of current density distributions for the QR code antennas of FIGS. 1A-C.

FIG. 2 illustrates the return loss of the QR code antennas of FIGS. 1A-C. The electrical current distribution of the antennas, shown in FIGS. 3A-C, illustrates which areas of the antenna radiate the most (indicated by the lighter areas within the respective predominantly active areas). It is noted that even irregular antenna (electrical current pathways) shapes can result in radiation at the correct frequency by fine-tuning or tweaking the QR code structure. Such fine tuning may be implemented by making small changes in a QR code, such as increasing/decreasing the number of electrically linked modules (i.e., the number of conducting pathways), increasing/decreasing the footprint of the QR code antenna, altering the shape of the modules, and/or increasing/decreasing the use of available space on a substrate. These changes may be implemented without hindering the required data of the code for various reasons, e.g., QR codes include error tolerances, etc. The three antennas of FIGS. 1A-C have respective simulated return losses of 11.42, 21.48 and 12.14 dB at 2.4 GHz. In the case where the continuous electrically conducting pathways encompass one or more alignment squares, the current density distribution could be more spread out and the footprint of the QR code antenna may be reduced.

Figure 4:
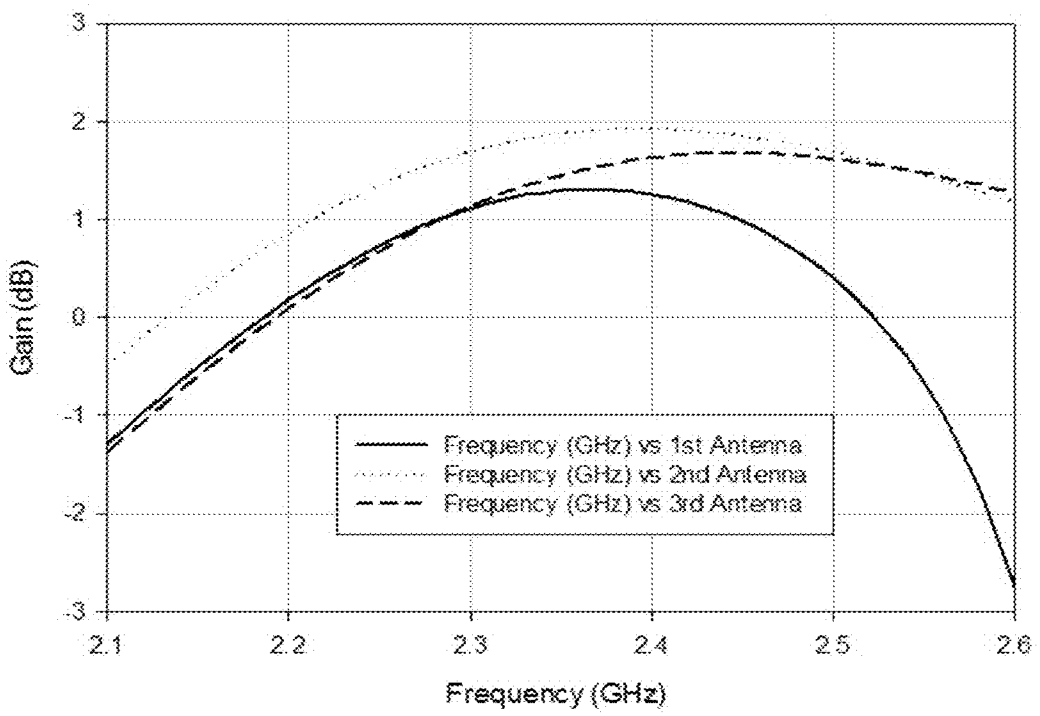
FIG. 4 is a pictorial representation of a gain plot for the QR code antenna patterns of FIGS. 1A-C.
Figure 5:
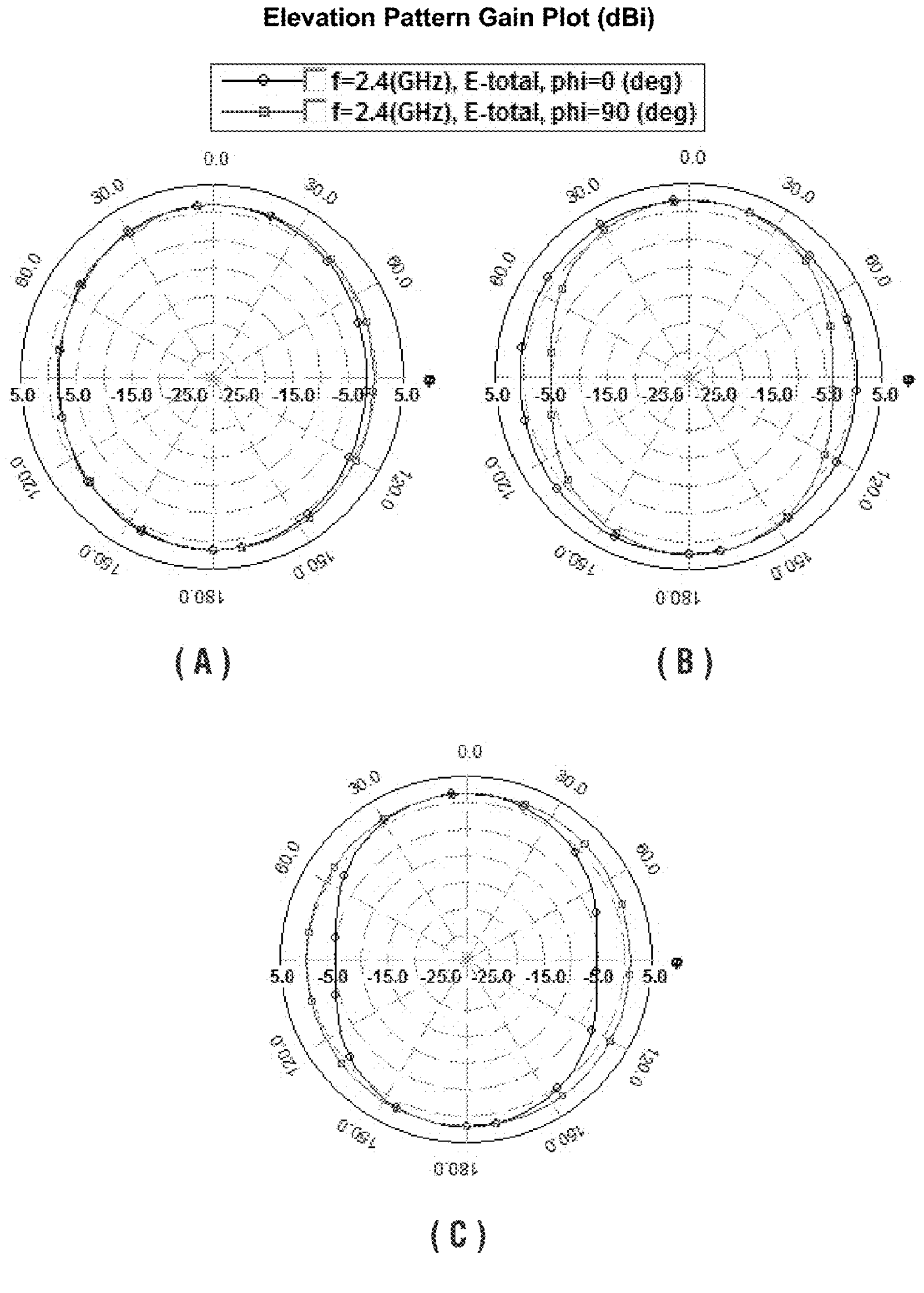
FIGS. 5A-C are pictorial representations of radiation pattern plots for the QR code antenna patterns of FIGS. 1A-C at the resonant frequency of the antennas.

FIG. 4 illustrates the radiation pattern for each QR code antenna of FIGS. 1A-C. As can be seen, the radiation pattern is near omnidirectional and with low gain as best suitable for a receiver. The simulated gain at 2.4 GHz is 1.26 dBi, 1.92 dBi and 1.64 dBi, respectively. The antennas have smooth omnidirectional radiation patterns as shown in FIGS. 5A-C for the two principle planes of the printed antenna structure.

FIG. 6 illustrates a QR code antenna in accordance with an embodiment of the present application. In this example embodiment, the designed QR code has been encoded with the "http://www.sdsmt.edu" website address, however the design and methodology presented can be applied in any matrix code antenna or a QR code of other internet website addresses as well, or more generally, any data/information.

In this embodiment, the antenna may be designed using IE3D and printed with an Optomec $M^3D$ Maskless Mesoscale Material deposition system using direct-write aerosol jetting of a conducting silver nanoink. The ink conductivity is about 40-60% or greater of bulk Ag, which allows for very high efficiency, electrically-conducting pathways to be housed in a metallic device such as a scannable code antenna in accordance with the present application. The same system may also be used to print Planar Inverted F antennas (PIFA) on hydrophobic paper substrate.

The frequency of operation was chosen to be 2.4 GHz, and depends on the size of the actual printed QR code as discussed above. Moreover, adjustments can be made to alter the frequency without significantly altering the encoded data/information of the QR code itself. The code, comprising a boundaried arrangement of a plurality of modules, may be scanned with any QR scanner or like scanner/imager/camera equipped with decoding software. A simulated model of the QR code antenna is shown in FIG. 6. The boundaried arrangement has a footprint of roughly 52 mm×52 mm. The antenna may be printed on Kapton® polyimide substrate with thickness 32-mil (0.8128 mm).

Figure 7:
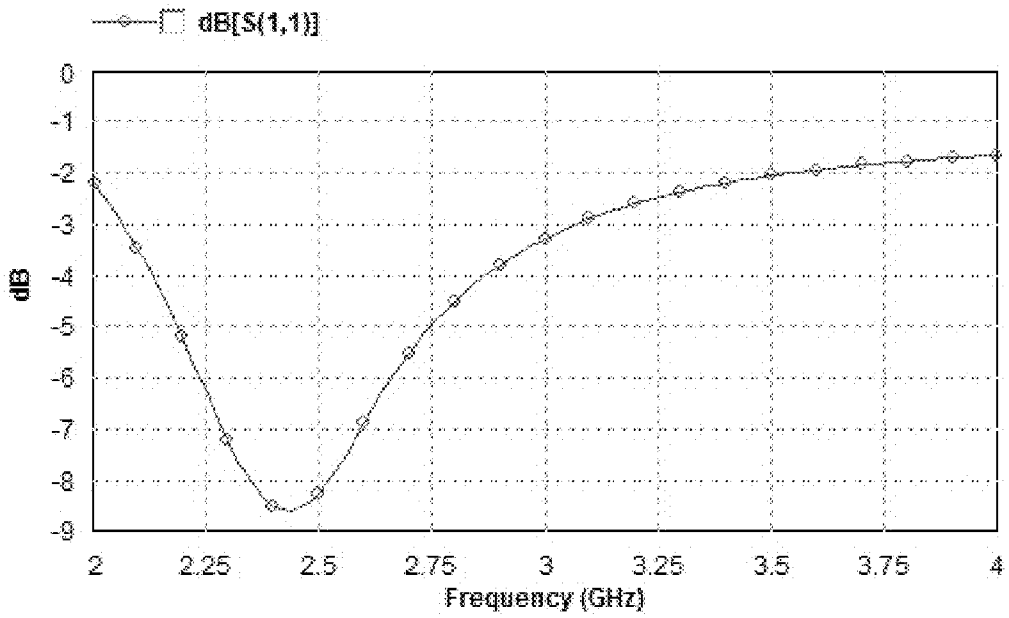
FIG. 7 is a pictorial representation of a simulated return loss plot for the QR code antenna pattern of FIG. 6.
Figure 8:
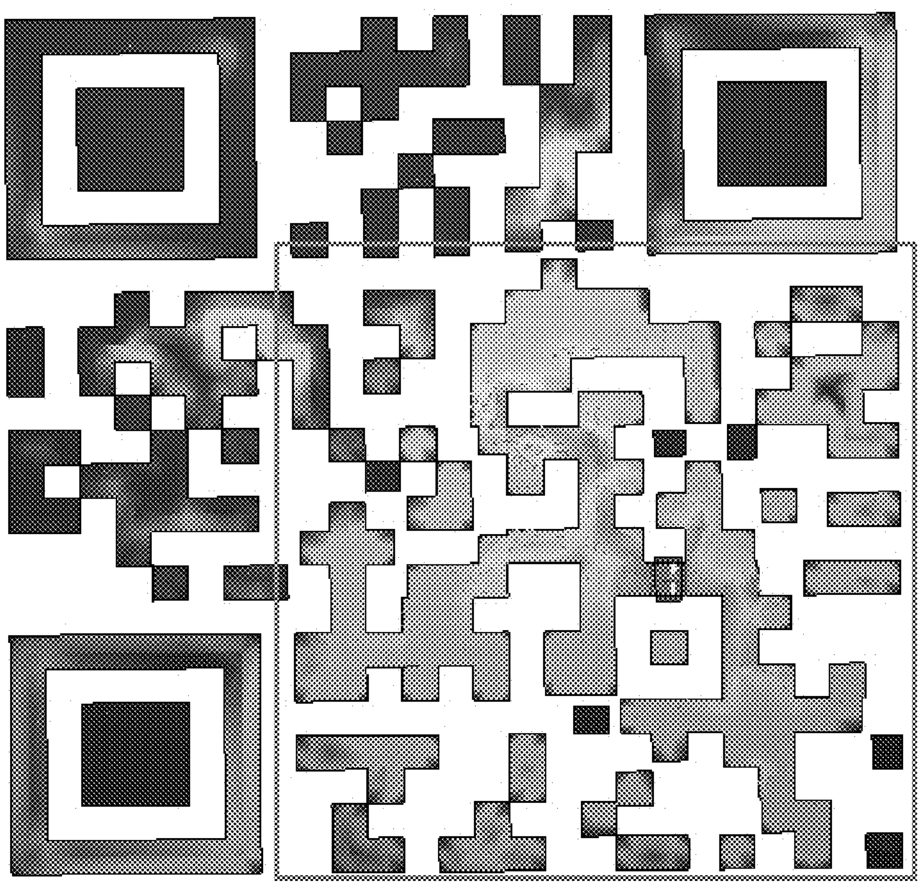
FIG. 8 is a pictorial representation of current density distributions for the QR code antenna pattern of FIG. 6.
Figure 9:
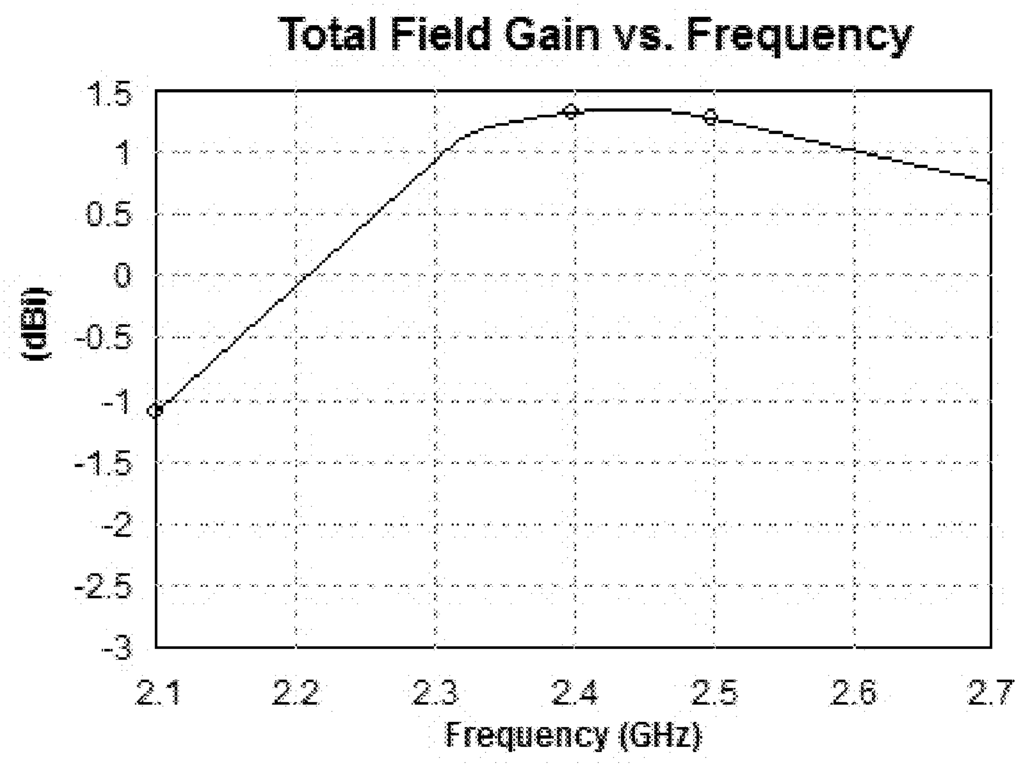
FIG. 9 is a pictorial representation of a gain plot for the QR code antenna pattern of FIG. 6.
Figure 10:
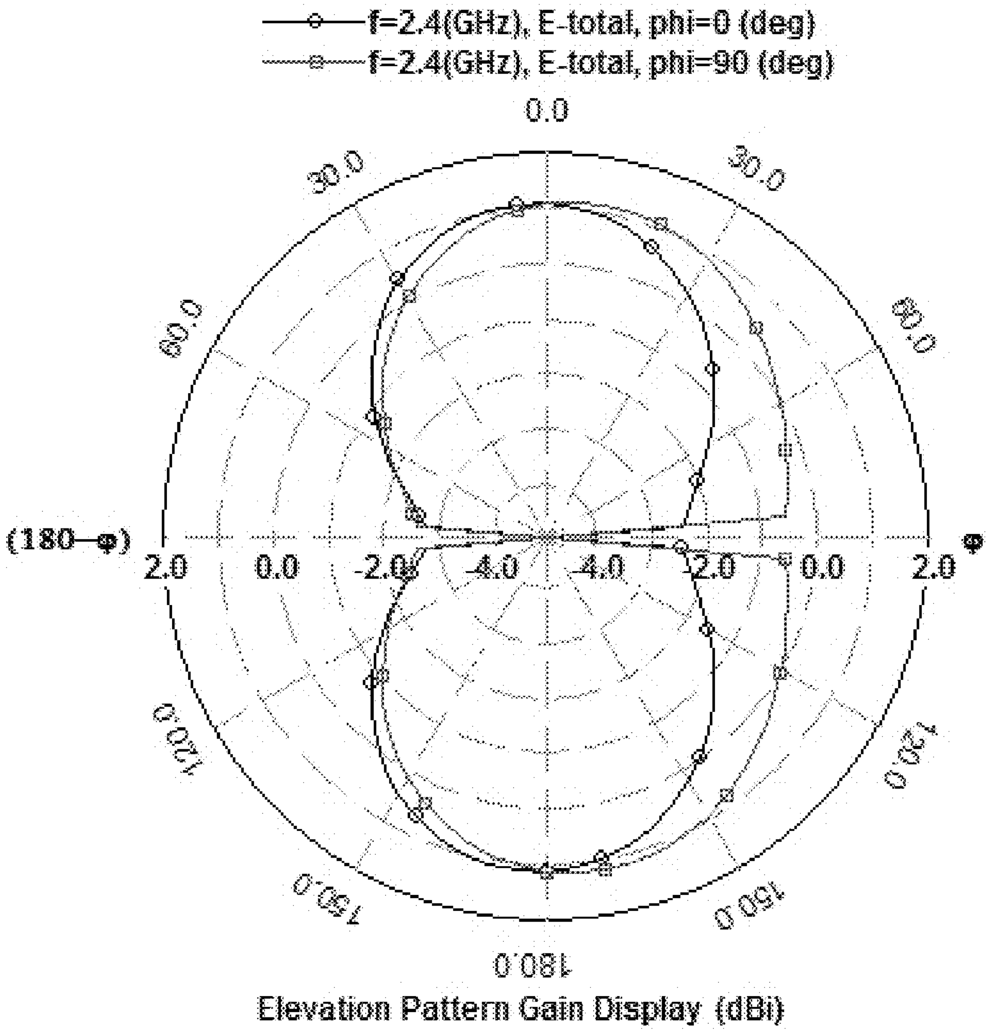
FIG. 10 is a pictorial representation of radiation pattern plots for the QR code antenna pattern of FIG. 6 at the resonant frequency of the antenna.

Relevant to the analysis of an antenna are its S-parameters. $|S_{11}|$ generally represents how much power is reflected from the antenna, and hence is known as the reflection coefficient (sometimes written as gamma or return loss. If $|S_{11}|=0$ dB, then generally all the power is reflected from the antenna and nothing is radiated. If $|S_{11}|=10$ dB, this implies that if 3 dB of power is delivered to the antenna, −7 dB is the reflected power. The remainder of the power was "accepted by" or delivered to the antenna. This accepted power is either radiated or absorbed as losses within the antenna. Since antennas are typically designed to be low loss, ideally the majority of the power delivered to the antenna is radiated. As expected, not all QR code antennas result in an antenna with very low $|S_{11}|$. In fact, many commercial applications may require a return loss of 8 dB or even 6 dB. Smaller $|S_{11}|$ may also be achievable. The return loss of the QR code antenna is shown in FIG. 7. Note that the current distribution of the antenna in FIG. 8 shows which areas of the antenna radiate the most. The gain of the antenna near the resonant frequency is shown in FIG. 9 and is +1.5 dBi. For the two principal plane cuts of a printed device of the present application, the antenna has a smooth omnidirectional radiation pattern as shown in FIG. 10.

It can be appreciated that the disclosed QR code antenna may be utilized in various applications. For example, anything that a radio frequency identification (RFID) chip as discussed above can implement may be implemented according to one or more embodiments of the present application. Although not shown, the antenna could include an RFID microchip for receiving, transmitting and/or storing data/information. In one aspect, a reader such as an RFID reader may be used to communicate with the RFID microchip through the QR code antenna. In at least embodiment, an electronic device may be used to program or reprogram an integrated circuit (e.g., an RFID microchip) associated with a QR code antenna of the present application.

Additionally, embodiments may utilize a QR code antenna for use in security applications, identification applications, anti-counterfeiting applications, device-tracking applications, etc. Functionality which is provided with near-field communication (NFC) devices may also be implemented utilizing QR code antennas in accordance with some embodiments.

In some embodiments, data originating from QR code antennas may be used with the functionality of a QR code scan. For example, a smartphone scanning a QR code may be directed to a website and the data originating from the QR code antenna may provide the smartphone and/or website with data such as authentication data. Additionally, the QR code antenna may either provide, or cause the scanning device to provide location data for the scan. Accordingly, embodiments may utilize data from the antenna to compliment the data, provide commands to the scanning device, etc.

It should be appreciated from the disclosure that at least one or more of the following concepts may be implemented, provided or otherwise carried out as one or more functions, operations, or processes of a QR code antenna of the present application. Although not shown, a QR code antenna of the present application could be configured with an integrated circuit for storing encoded information/data, such as on a microchip. Thus, one type, batch or subset of information may be received, stored and transmitted from the integrated circuit. The information/data may be encoded on the microchip. Still further information/data may be encoded on in the QR code or like matrix code. Thus, another type, batch or subset of information may be encoded in and read from a code, such as a QR code, of one or more embodiments of the present application. The information/data from both sources may be used for various security purposes. In one aspect, information/data from both sources may be used together to provide a completed set of information/data. For example, data/information encoded in the matrix code may include only a portion of the intended packet of information/data to be communicated upon reading the code. The portion of the data/information not included in the scannable code may be included in an integrated circuit, such as a microchip, which is delivered by communication with the QR code antenna via the antenna using, for example, a reader. In another aspect, one source may be used to authenticate another source. For example, information/data received by communication with the apparatus via the antenna may be used to authenticate or decode information/data received by scanning the code. In another aspect, the reverse of this process is also true. Data/information provided by scanning the code may be authenticated or decrypted by data or information provided by communication with the apparatus via the antenna, such as communication with a programmable integrated circuit of the apparatus that includes additional information/data for authenticating or decrypting information encoded in the matrix code (e.g., QR code). In these instances, information and data may be acquired, for example, from optically scanning a QR code, however, additional information or data may not be acquired by communicating with an integrated circuit via the antenna, thereby preventing the data or information received by optically scanning the code from being authenticated or decoded.

In another example, the apparatus may be configured to send out data or information by optically scanning the code and sent out additional information/data by communication with the apparatus via the antenna, whereby the two parts of information/data converts to a simple complete message. In this manner, one might attempt to illegally replicate the code portion of the apparatus without realizing or having capability of encoding information on the integrated microcircuit portion of the antenna to develop a copy or counterfeit of a QR code antenna, device or apparatus of the present application.

In any of the above examples, an integrated circuit associated with a QR code antenna of the present application may be reprogrammed by via communication from an electronic device and the antenna to encode additional, supplemental or other information/data on a microchip associated with the device or apparatus. Other security aspects are also contemplated. For example, the matrix code may be prepared or configured with a covert, semi-covert or visible ink material. In one embodiment, the QR code may be printed so as to be invisible and not readily available to human perception.

In another example, the RFID circuit may be embedded within a substrate, covered by a layer or otherwise obscured from view. In one example, the RFID component may be obscured within a substrate or behind a layer on which the matrix code is printed. In this manner, either components of the device may be hidden or otherwise obscured from human perception. In another aspect, the apparatus of the present application may be used for RFID functionality only and not provide access to the QR code functionality of the device. Also, communication with one of the components of the device may indicate the presence of the other component of the device. For example, in the case where the matrix code is invisible to human perception, communication with the RFID signal may indicate the presence of a QR code which encodes additional data/information to use separately, in conjunction or in combination with the encoded information received from the RFID component. Alternatively, the code matrix may be visible and upon scanning may provide data/information indicating the presence of an RFID circuit and providing data/information for authenticating, decrypting, or otherwise interpreting or understanding a portion or all of the information provided in either one of the code matrix or RFID circuit. In this manner, data/information from a matrix code may be used to compare with, contrast with, authenticate, decode, or otherwise be correlated with an RFID signal from the device.

It is noted that the construction and design of the above-described embodiments are not limiting. Antennas and QR codes may be constructed with any material which allows for proper antenna conduction and code reading. Embodiments are also not limited by particular modes of construction, functioning frequencies, etc. For example, the antennas may be constructed with solid rectangles (visible, maximum contrast, readable with a QR reader), wire-frames (near-invisible, unreadable with QR reader), etc. QR code antennas may also be scaled to provide for different frequency response characteristics. Such scaling may involve changing the size of the QR code itself, or by having only a portion of the code comprise the antenna.

Additionally, it is noted that QR code antennas may be made to be visible, near-invisible, invisible, as well as concealed and unexpected from potential counterfeiters. The QR antenna is made of inks that can be visible or invisible under ambient lighting conditions. The invisible QR antenna can be made for example by printing green and blue (or other) up-converting inks and can be readable only (for example) using a near-IR laser. QR antennas may also be printed underneath the visible QR codes, an can be made to be completely invisible. Further, the QR code may radiate a signal or code that can be the same or different from the one shown visibly.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized.

Accordingly, the appended claims are intended to include within their scope such processes, machines, manufacture, compositions of matter, means, methods, or steps.

What is claimed is:

1. A method, comprising steps of:

providing a substrate;

encoding scannable code information on the substrate in a boundaried arrangement of a plurality of modules;

conductively linking a subset of the plurality of modules within the boundaried arrangement;

providing a feed point in operable communication with the subset of the plurality of modules, the feed point being capable of receiving and transmitting a signal; and communicating one or more types of information from one or more sources comprising:

a. the boundaried arrangement of the plurality of modules;

b. the subset of the plurality of modules within the boundaried arrangement.

2. The method of claim 1 wherein separate configurations of the subset of the plurality of modules are associated with separate operating frequencies.

3. The method of claim 1 further comprising receiving a programming signal through one or more conducting pathways between the subset of the plurality of modules.

4. The method of claim 1 further comprising communicating a first subset of information from the boundaried arrangement of the plurality modules and a second subset of information from the subset of the plurality of modules within the boundaried arrangement.

5. The method of claim 1 further comprising receiving and transmitting information through the conductively linked subset of the plurality of modules within the boundaried arrangement.

6. The method of claim 1 further comprising altering a number of conductively linked subset of the plurality of modules within the boundaried arrangement for tuning an operating frequency.

7. The method of claim 1 further comprising decoding a first subset of information with a second subset of information, wherein the first and second subsets of information are communicated from separate sources.

8. A quick response (QR) code antenna, comprising:

a substrate;

a boundaried arrangement of a plurality of modules on the substrate;

information encoded by the plurality of modules;

one or more conducting pathways between at least a portion of the plurality of modules;

an antenna comprising the one or more conducting pathways between the plurality of modules;

a first configuration of the plurality of modules connected by the one or more conducting pathways;

a first operating frequency associated with the antenna and corresponding to the first configuration;

a second configuration of the plurality of modules connected by the one or more conducting pathways; and a second operating frequency associated with the antenna and corresponding to the second configuration, wherein the first operating frequency and the second operating frequency are unequal.

9. The quick response (QR) code antenna of claim 8 further comprising an integrated circuit connected to the antenna.

10. The quick response (QR) code antenna of claim 8 wherein the boundaried arrangement of the plurality of modules comprises the QR code and the portion of the plurality of modules comprises the antenna.

11. The quick response (QR) code antenna of claim 10 further comprising:

a feed point disposed within the portion of the plurality of modules comprising the antenna.

12. The quick response (QR) code antenna of claim 8 wherein the antenna is comprised of up-converting inks that are invisible under ambient lighting conditions.

13. The quick response (QR) code antenna of claim 8 further comprising one or more alignment squares within the boundaried arrangement comprising some of the portion of the plurality of modules comprising the antenna.

14. A method, comprising steps of:

encoding data within a two-dimensional bar code printed as an electrically conductive material on a substrate;

generating an antenna on the substrate using the electrically conductive material, the antenna comprising a pattern of a plurality of modules;

transmitting a first signal to the antenna;

receiving a second signal from the antenna; and altering the pattern of the plurality of modules to tune the antenna to a desired operating frequency;

wherein the two-dimensional bar code and the antenna are integrated such that at east a portion of the antenna is also a portion of the two-dimensional bar code.

15. The method of claim 14 wherein the two-dimensional bar code is a quick response (QR) code.

16. The method of claim 14 further comprising the steps of:

associating a first portion of the encoded data with the two-dimensional bar code;

associating a second portion of the encoded data with the antenna; and reading the first portion of the encoded data from the two-dimensional bar code or reading the second portion of the encoded data from the antenna, wherein the first portion of the encoded data alerts a user to a presence of the antenna containing the second portion of the encoded data or the second portion of the encoded data alerts a user to a presence of the two-dimensional barcode containing the first portion of the encoded data.

17. The method of claim 16 further comprising the step of determining if an article associated with the two-dimensional bar code and the antenna is genuine using the data from the first portion of the encoded data or the second portion of the encoded data.

18. The method of claim 16 wherein the wherein the first portion of the encoded data authenticates the second portion of the encoded data or the second portion of the encoded data authenticates the first portion of the encoded data.

19. The method of claim 16 wherein the wherein the first portion of the encoded data decrypts the second portion of the encoded data or the second portion of the encoded data decrypts the first portion of the encoded data.

20. The method of claim 14 further comprising the step of reprogramming the antenna.

21. An apparatus, comprising:

a boundaried physical arrangement of a plurality of modules configured to convey one or more types of information on a scannable code;

an antenna element comprised of a subset of the plurality of modules within the boundaried arrangement;

one or more electrically conducting pathways between the subset of the plurality of modules, wherein the antenna element is comprised of inks that are invisible under ambient lighting conditions, and wherein the inks are green and blue up-converting inks.

22. An apparatus, comprising:

a boundaried physical arrangement of a plurality of modules configured to convey one or more types of information on a scannable code;

an antenna element comprised of a subset of the plurality of modules within the boundaried arrangement;

one or more electrically conducting pathways between the subset of the plurality of modules, wherein the antenna element is comprised of inks that are invisible under ambient lighting conditions, and wherein the subset of the plurality of modules can be adjusted up or down to allow the antenna element to be tunable to a desired operating frequency.

23. An apparatus, comprising:

a boundaried physical arrangement of a plurality of modules configured to convey one or more types of information on a scannable code;

an antenna element comprised of a subset of the plurality of modules within the boundaried arrangement;

a feed point associated with the antenna and disposed within the plurality of modules;

one or more electrically conducting pathways between the subset of the plurality of modules, wherein the antenna element is comprised of inks that are invisible under ambient lighting conditions, and wherein the feed point is configured to collect incoming signals, convert the incoming signals to electric current, and transmit the electric signals to an integrated circuit.

24. An apparatus, comprising:

a boundaried physical arrangement of a plurality of modules configured to convey one or more types of information on a scannable code;

an antenna element comprised of a subset of the plurality of modules within the boundaried arrangement;

one or more electrically conducting pathways between the subset of the plurality of modules, wherein the antenna element is comprised of inks that are invisible under ambient lighting conditions, and
wherein the inks are readable only using a near-infrared laser.

25. An apparatus, comprising:
a boundaried physical arrangement of a plurality of modules configured to convey one or more types of information on a scannable code;
an antenna element comprised of a subset of the plurality of modules within the boundaried arrangement;
one or more electrically conducting pathways between the subset of the plurality of modules,
Wherein the antenna element is comprised of inks that are invisible under ambient lighting conditions;
wherein one or more types of information comprises a first subset originating from a first source and a second subset originating from a second source; and
wherein the first source comprises a linear code formed by the plurality of modules and the second source comprises an antenna element formed by the one or more conducting pathways in the subset of the plurality of modules.

* * * * *

UNITED STATES PATENT AND TRADEMARK OFFICE

CERTIFICATE OF CORRECTION

PATENT NO. : 9,105,973 B2
APPLICATION NO. : 14/213463
DATED : August 11, 2015
INVENTOR(S) : Dimitrios Anagnostou et al.

It is certified that error appears in the above-identified patent and that said Letters Patent is hereby corrected as shown below:

In the Claims

Column 9, Claim 14, Line 56:
"east" should be --least--

Column 10, Claim 18, Line 11:
delete the second occurrence of "wherein the"

Column 10, Claim 19, Line 15:
delete the second occurrence of "wherein the"

Column 11, Claim 25, Line 13:
"Wherein" should be --wherein--

Signed and Sealed this
Twenty-ninth Day of December, 2015

Michelle K. Lee
*Director of the United States Patent and Trademark Office*